Dec. 10, 1968     A. L. DEAN     3,416,129
VEHICLE ALARM SYSTEM
Filed Sept. 7, 1965

INVENTOR.
ARTHUR L. DEAN

BY *Westell & Hanley*

PATENT AGENTS

United States Patent Office 3,416,129
Patented Dec. 10, 1968

3,416,129
VEHICLE ALARM SYSTEM
Arthur L. Dean, Stoney Creek, Ontario, Canada, assignor to Syntron (Canada) Limited, Stoney Creek, Ontario, Canada
Filed Sept. 7, 1965, Ser. No. 485,184
Claims priority, application Canada, Nov. 12, 1964, 916,224
6 Claims. (Cl. 340—32)

This invention relates to a motor vehicle warning system. The invention is particularly adapted for use with public vehicles such as an autobus or limousine but the uses of the invention are not limited to motor vehicles of this type. The novel warning system is well adapted to provide warning to the vehicle's occupants of its approach to a railway or other vehicular crossing, but the invention may be used to warn of a moving object such as the train itself, as distinct from the crossing, to warn of a through highway or to warn of an open bridge or the like.

It is known to provide warning systems wherein a transmitter will cause a visible or audible alarm in a vehicle. Such systems have not, however, been provided with means for ensuring that any proper action is taken by the vehicle operator as a result of such warning.

This invention provides means in a vehicle for receiving a signal transmitted from an outside source which may be a static transmitter located at a crossing, intersection or a bridge; or may be mounted on a moving vehicle such as a train; and in response to the receipt of such signal by a receiver in a vehicle, acting to cause a sensible alarm therein. By "sensible" I mean any physical form which will act upon the human senses such as in visible form as by a light, or in audible form by a bell, buzzer, or the like. In accord with the invention, receipt of the transmitted signal also acts to complete a circuit which will cause such sensible signal to continue until the vehicle has been brought to a stop, or below a predetermined slow speed. In this way not only is the driver of the vehicle alerted, but also, the passangers are made aware of the danger and of the necessity of the carrying out of the proper operation by the driver.

In a preferred form of the invention and suitable for buses, there is provided means for ensuring that the alarm signal will continue not only until the vehicle has been brought to a full stop, but also until the doors have been opened.

In a further preferred form of the invention circuitry is provided so that: once the necessary action has been taken by the operator of the vehicle to stop the alarm (i.e. stopping the vehicle or opening the doors, or both), the alarm cannot be immediately re-operated by a signal from the same transmitter.

Preferably the circuitry referred to in the previous paragraph operates (once the alarm has been triggered by a transmitter, and its operation halted by the proper action) to prevent the alarm circuit resetting for further operation until: (a) the vehicle has passed beyond the operative transmission range of the transmitter originally triggering the alarm, or (b) until the alarm has ceased to operate.

In drawings which illustrate a preferred form of the invention:

Figure 1:
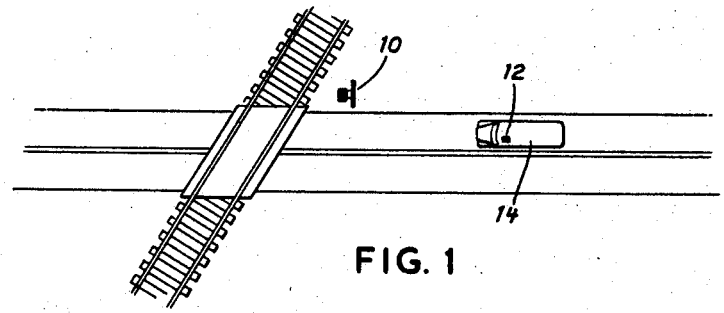
FIGURE 1 shows the intersection of a railroad and a roadway to demonstrate a suitable use of the invention.

In FIGURE 1 the intersection of a road at a level crossing with a railroad is illustrated and a transmitter 10 is shown for transmitting on a predetermined frequency for reception by a receiver and alarm system 12 located in a vehicle such as the auto bus 14 shown. The receiver and alarm system are shown more fully in FIGURES 2 and 3.

Figure 2:
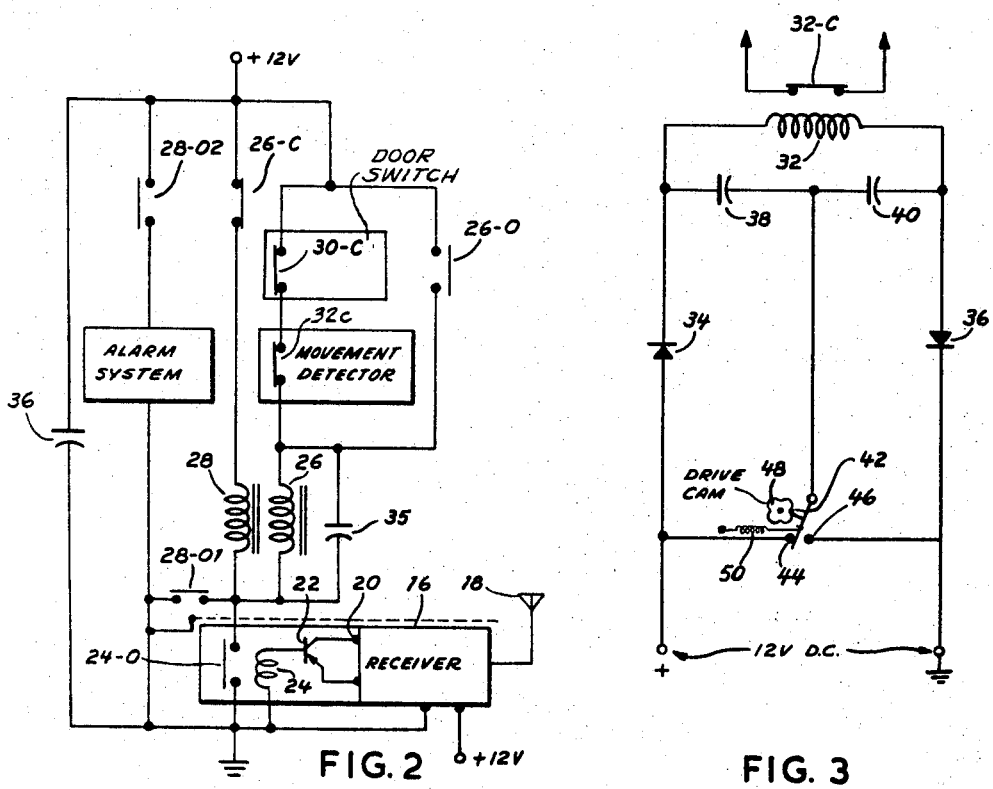
FIGURE 2 is an illustration of the control system to be contained in the vehicle.

In FIGURE 2 there is shown a control system comprising a receiver 16 with a suitable antenna 18 for receiving the transmitted signal on the predetermined frequency of transmitter 10. The circuitry of such receiver is not shown as this is well known, but the output of the receiver in audio or other suitable form is produced at a sufficient level at terminal 20 to actuate (through transistor 22 or in another convenient manner) coil 24 to close the normally open contacts 24-O. A potential source such as the 12 volt vehicle supply is connected through normally closed contacts 26-C of a relay coil 26, relay coil 28 and contacts 24-O in series, to ground. In parallel with contacts 24-O in such circuit are normally open contacts 28-O1 of relay coil 28. In parallel with such circuit between the 12 volt source and ground are the normally open contacts 28-O2 of the relay coil 28 and the alarm system, in series. The alarm system is constructed to produce an alarm in any sensible form, such as by horn or buzzer, on closure of contacts 28-O2.

The receiver and the relay 24 will be designed so that sufficient power to actuate the contacts 24—O will only be available when the vehicle has come within a predetermined proximity to the transmitter 10. The 12 volt source is also connected to one end of a relay coil 26 through two parallel circuits. The first circuit contains contacts 30 arranged to be actuated by the opened or closed condition of the bus door in series with normally closed contacts 32-C actuated in accord with whether the vehicle is moving or travelling below a predetermined (slow) speed. The contacts 30 are arranged so that when the bus door is closed the relay contacts 30 are opened and vice versa and the contacts 32-C are arranged so that when the vehicle is moving at usual driving speeds, the contacts 32-C are open, and when the vehicle is stationary or travelling at lower than a predetermined speed, the contacts 32-C are closed. The operation of the movement detector operating relay 32 will be explained hereafter. In parallel with the contacts 30 and the contacts 32-C between the 12 volt source and the coil 26 is a circuit having the normally open contacts 26-O. The end of coil 26, on its end remote from the contacts 32 and 26-O is connected through the contacts 24-O and 28-O1 in parallel to ground, the contacts 28-O1 being operated by coil 28. A condenser 35 is placed in parallel with coil 26 to prevent premature de-energization of the coil 26 and release of its contacts. Thus in the event of erratic operation of contacts 24—O due to interference in the receiver from external noise generators, during the interval of time required for the vehicle to pass out of range of transmitter 10, the condenser 35 will keep relay 26 energized. In parallel with the various lines between the 12 volt source and ground is a condenser 36 whose purpose is to allow noise from the ignition system to bypass the apparatus. It will be noted that the receiver is shielded and connected to ground.

Figure 3:
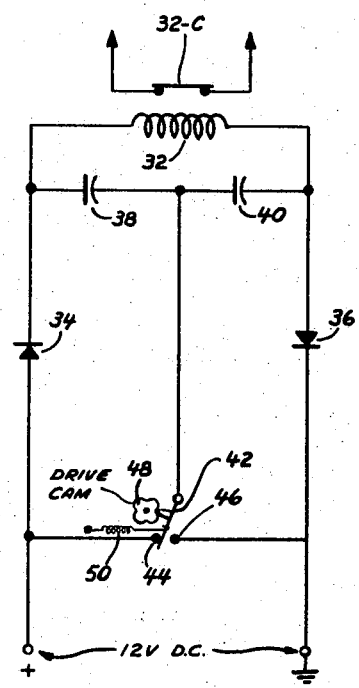
FIGURE 3 is a detailed illustration of some of the circuitry used in the device of FIGURE 2.

The movement detector is illustrated in FIGURE 3 wherein a coil 32 is connected and located to operate the normally closed contacts 32-C. Assuming a 12 volt supply in the vehicle, the coil 32 is designed to open contacts 32-C at just less than 24 volts but more than 12 volts. One end of the coil 32 is connected to the 12 volt source through a rectifier 34 oriented to ensure the travel of current from the source to the coil, and the other end of coil 32 is connected to ground through a rectifier 36 oriented to ensure the passage of current through rectifier 36, only in the direction from the coil 32 to ground. Connected in parallel with the coil 32 are a pair of condensers 38 and 40 in series and an oscillatable switch arm 42 is connected to the connection between the condensers 38 and 40. The oscillating switch arm 42 is designed to move between the terminal 44, connected to the positive source, and terminal 46 connected to ground. The switch arm 42 is operated by a drive cam 48 and a biasing spring 50, such as that schematically shown, to oscillate between terminals 44 and 46, when the vehicle is moving. The drive cam 48 is operated from the speedometer cable of the vehicle although it may be operated from some other part of the vehicle mechanism which is moving when the vehicle is moving.

The purpose of rectifiers 34 and 36, is to prevent capacitors 38 and 40 from discharging over switch 42, i.e., when the switch 42 arm is at terminal 44, diode 34, because of its polarity, prevents capacitor 38 from discharging over switch 42 and likewise diode 36 will prevent capacitor 40 from discharging over switch 42 when the switch arm is at terminal 46. The reverse impedance of diodes 34 and 36 is in the order of several megohms, therefore, presenting a leakage path far less than the impedance of relay coil 32, thus the leakage effect of diodes 34 and 36 on the circuit operation is negligible.

In accord with the design, when the vehicle and the oscillating arm 42 are not moving (or moving at a very slow predetermined speed, in the situation hereinafter discussed), 12 volts DC will appear across the coil 32 and in accord with the design of the coil 32 this is not sufficient to open contacts 32-C which are designed to operate at a voltage of between 12 and 24 volts. When the vehicle is moving with the oscillating arm 42, moving, connected to the 12 volt source terminal 44, condenser 40 is charged to approximately 12 volts; while when the arm 42, moving, is connected to the ground terminal 46 the condenser 38 is charged to 12 volts and hence slightly less than 24 volts will appear across the coil, the 24 volts being reduced by the leakage from each of the condensers 38 and 40 during the charging of its counterpart. With a voltage of just under 24 volts across the coil, this by design is enough to open contacts 32-C and hold them open during the operation of the vehicle at such driving speeds.

It will be noted that the length of time that a charge of predetermined value is mainained on condensers 38 and/or 40 is dependent upon the "CR constant" that is, the capacity of the condenser involved and the resistance between it and one or the other of the positive source and/or ground. Hence for any capacitive and resistive value there will be a very low speed below which the relay contacts 32-C will be closed as if the vehicle were stopped. Hence it will be understood that with the circuit as shown there will always be a low speed below which the contacts 32-C will be closed hence the circuitry will act as if the vehicle was stopped but that circuit and cam design may be made to make this value as low as desired, i.e. one or two miles an hour or a fraction of a mile an hour. Moreover, it will be noted, within the scope of the invention, that the movement detector shown may be replaced by any other type of movement detector designed to operate to close contacts, 32-C, when the vehicle is travelling below a certain velocity, or is stopped and to open such contacts at other times.

In the operation of the device overall, with the vehicle in motion, it will be seen that, in the absence of a transmitted signal of sufficient strength at the receiver, contacts 24-O will be open, hence the coil 28 is de-energized; hence contacts 28-O2 are open, hence the alarm system is not in operation (contacts 28-O1 are "lock in" contacts for coil 28 but at this time these will also be open, because the relay 28 would have been previously de-energized by the opening of contacts 26-C at a time when contacts 24-O were de-energized). The bus door actuated contacts 30 are open as the bus doors are closed, and the movement detector contacts 32-C are open since the vehicle is travelling at driving speeds. Since the contacts 24-O and 28-O1 are open, it will be seen that the coil 26 is de-energized, hence the contacts 26-C are closed.

In accord with the operation, when the vehicle approaches to within the predetermined distance of a constantly transmitting signal from the transmitter 10, the strength of the received transmission is sufficient, that the output of the receiver through coil 24 is sufficient to close contacts 24-O. When this occurs, relay 28 is energized closing contacts 28-O1 and contacts 28-O2. The closing of contacts 28-O1 will "lock in" relay coil 28 until the subsequent opening of contacts 26-C. The purpose of contacts 28-O1 is to prevent the interruption of the operation of the system in the event of a faulty or chance interruption of the transmitted signal. The closing of conacts 28-O2 actuates the alarm system which might be a light or an audible device, but in a bus would customarily be a horn, buzzer or bell which will notify the driver and the passengers that the vehicle is approaching a dangerous intersection or crossing. The purpose of the closing of contact 28-O1 is to ensure continuance of the alarm in the event of some interruption of the transmitter. As long as the driver continues to take no action in response to the alarm, the alarm will continue to operate, alerting both driver and passengers. When the driver stops the bus or slows it to less than a predetermined speed then the voltage across the coil 32 is reduced below the operating level to open contacts 32-C and the contacts 32-C are allowed to close. When the doors are opened the contacts 30 are closed and the closing at the same time, of contacts 30, and 32-C completes a circuit through these contacts and contacts 24-O or 28-O1 in parallel to ground and causes energization of the relay 26 which locks itself in by closing contacts 26-O for a purpose to be hereinafter discussed. At the same time, the energization of relay 26, opens the contacts 26-C de-energizing relay 28, and opening the "lock in" contacts 28-O1, but also opening the alarm system contacts 28-O2, halting the alarm. The purpose of the locking contacts for relay 26-O is to ensure that the vehicle having stopped and opened its doors, that the alarm will not be immediately re-energized due to the continued existence of the transmitted signal by the opening of contacts 30 or 32-C when the bus doors are closed and the bus is restarted.

As stated above, once the bus has been stopped, and the doors opened, simultaneously, the alarm is shut off although the contacts 24-O remain closed since the vehicle will (in the case of a stationary transmitter) be still in the vicinity of the transmitter. When the vehicle has passed beyond the range of the transmitter, the receiver allows the contacts 24-O to open, de-energizing coil 26 (contacts 28-O1 being already open) and opening the locking contacts 26-O. Contacts 26-C now close but the alarm is silent as contacts 24-O are now open. Thus the circuitry is reset for a further operation to be set off when a new transmitted signal is received. However it will be noted that due to the locking contacts 26-O circuitry was not re-set for further actuation of the alarm until the vehicle is no longer effectively receiving the first transmitter.

Moreover it will be noted that locking contacts 28-O1 ensure that a chance interruption of the transmitted signal, cannot turn off the alarm which will persist until the doors are open and the vehicle halted.

It will be noted that, in the embodiments shown, the alarm may not be halted until both the bus doors are open and the bus stopped simultaneously. It will be noted that if desired the vehicle could be designed so that the alarm could be halted by stopping the vehicle without opening the bus door. It will further be noted that other operations, to occur simultaneously with the stopping of the vehicle, may be required to be performed, merely by providing a set of normally open contacts corresponding to such operation, in series with contacts 32–C and coil 26, with such contacts designed to close when the further required operation has been performed.

It will further be noted that whereas a stationary transmitter is shown, the transmitter could be mounted in a dangerous vehicle such as a train. In such event, the operation would be as previously described, except that the contacts 24–O would be opened because the transmitter had passed beyond the range of the receiver (rather than vice versa), but when contacts 28–O1 are used it would be necessary to complete the stopping of the vehicle and the opening of the doors (in the circuit shown) before the system could be reset.

One of the numerous operational designs using the invention comprises a system wherein a railway crossing is provided with a stationary transmitter and the trains appearing at the crossing are provided with a second transmitter, and wherein the bus alarm and system operate in accord with the alarm, as above described, with the alarm actuated by the first transmitter, and with means provided in the bus to prevent it, once stopped, from starting up if, when stopped, a signal is received from the second transmitter. Such secondary result, operated by an approaching train, would be particularly valuable where the approaching train would be hidden by obstructions until it nearly reaches the crossing. Such secondary result would be effected by causing the signal from the train transmitter to lock the brakes or put the gear in neutral, but in either arrangement the bus would of course be provided with means allowing the bus operator to override the control signal's effect on the gears or brake in the case of emergency.

I claim:

1. A motor vehicle warning system comprising: means designed and constructed, when energized, to emit a sensible alarm apparent on the inside of said vehicle, a circuit constructed and designed to energize said means when closed, means energizable by the receipt of a transmitted signal to close said circuit to energize said alarm, means independent of signals originating exterior to said vehicle designed to provide a response conditional on the movement of the vehicle at lower than a predetermined speed for opening said circuit and terminating said sensible indication.

2. A motor vehicle warning system as claimed in claim 1 including means operative after the first closing of said circuit after receipt of a transmitted signal to prevent re-closing after opening of said circuit until the strength of the transmitted signal causing said first closing falls below a predetermined amount.

3. A motor vehicle warning system as claimed in claim 1 wherein said means, for opening said circuit and terminating said alarm, designed to provide: a response conditional on the movement of the vehicle at lower than a predetermined speed; is also conditional on the opening of the door of such vehicle at the time of such lower speed.

4. A motor vehicle warning system comprising: first means in such motor vehicle responsive to reception of a transmitted signal of predetermined strength to close a circuit designed and connected, when closed, to initiate a sensible indication of said reception, and second means having a response conditional on the movement of said vehicle at lower than a predetermined speed, for opening said circuit to terminate said sensible indication, and wherein means are provided, responsive to the movement of said vehicle at lower than a predetermined speed; following a closure of said circuit, for preventing a further closure of said circuit until the strength of the transmitted signal causing said first closure falls below a predetermined amount.

5. A motor vehicle warning system comprising: a sensible indicator, designed and connected, when energized, to provide a sensible indication apparent on the inside of such vehicle; a circuit designed and connected when closed, to energize said indicator; means responsive to reception of a transmitted signal of predetermined strength to close said circuit; and means, independent of signals originating exterior to said vehicle, designed to terminate said sensible indication on the movement of the vehicle at lower than a predetermined speed.

6. A motor vehicle warning system comprising: means designed and constructed, when energized, to emit a sensible alarm; a circuit designed and connected to energize said means when closed to energize said alarm means; means energizable by the receipt of a transmitted signal to close said circuit, and means energizable by the opening of the door of such vehicle to open said circuit and de-energize said alarm.

References Cited

UNITED STATES PATENTS

| 2,025,106 | 12/1935 | Hirshfeld | 340—32 |
| 2,656,002 | 10/1953 | Keeton | 340—32 |
| 3,229,249 | 1/1966 | Brenner | 340—32 |

THOMAS B. HABECKER, *Primary Examiner.*

U.S. Cl. X.R.

325—64; 340—52